United States Patent [19]

Matthias et al.

[11] 4,198,582
[45] Apr. 15, 1980

[54] HIGH PERFORMANCE STEPPER MOTOR

[75] Inventors: Dan W. Matthias, Downingtown, Pa.; Richard D. Thornton, Concord, Mass.

[73] Assignee: Exxon Research & Engineering Co., Florham Park, N.J.

[21] Appl. No.: 809,646

[22] Filed: Jun. 24, 1977

[51] Int. Cl.² ............................................. H02K 41/00
[52] U.S. Cl. ...................................... 310/12; 318/135
[58] Field of Search ................................... 310/12–14, 310/168, 268, 49; 318/135, 37, 38

[56] References Cited

U.S. PATENT DOCUMENTS

| | | | |
|---|---|---|---|
| 2,627,040 | 1/1953 | Hansen | 310/49 |
| 3,042,818 | 7/1962 | Busch | 310/49 |
| 3,320,450 | 5/1967 | Bosco, Jr. et al. | 310/168 |
| 3,329,843 | 7/1967 | Anderson | 310/168 |
| 3,566,224 | 2/1971 | Vallauri et al. | 318/135 |
| 3,761,755 | 9/1973 | Inaba et al. | 310/49 X |
| 3,904,897 | 9/1978 | Shichida et al. | 310/12 |

Primary Examiner—Donovan F. Duggan
Attorney, Agent, or Firm—Norman L. Norris

[57] ABSTRACT

A high performance stepper motor comprises a stator having a plurality of pole positions. Each of the pole positions includes a plurality of stator elements or teeth on opposite sides of a stator-to-stator air gap with nonmagnetic material located in the spaces between the extremities of the teeth. Energization means in the form of a plurality of windings adapted to be connected to a multiphased drive source are associated with the stator means at the various pole positions respectively. Motive means comprising a rotor or a slider includes a plurality of motive elements which comprise teeth or slugs. In order to further achieve low inertia and a high force-to-mass ratio of the passive means, the motive means comprises discontinuities in the magnetic material thereof including nonmagnetic material between the extremities of the motive elements so as to reduce flux leakage in the direction of movement of the passive means through the air gap while simultaneously reducing the mass of the motive means.

11 Claims, 12 Drawing Figures

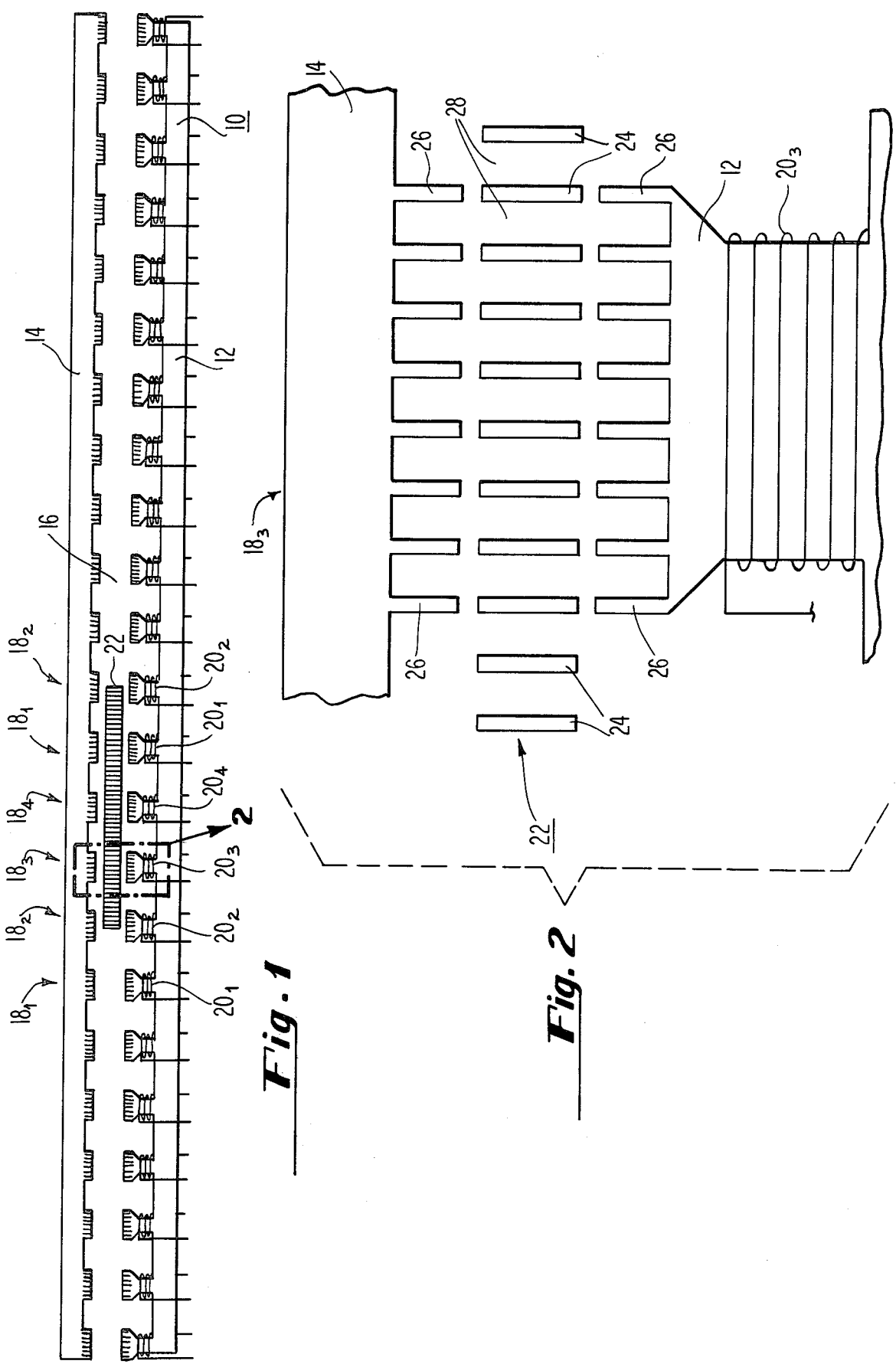

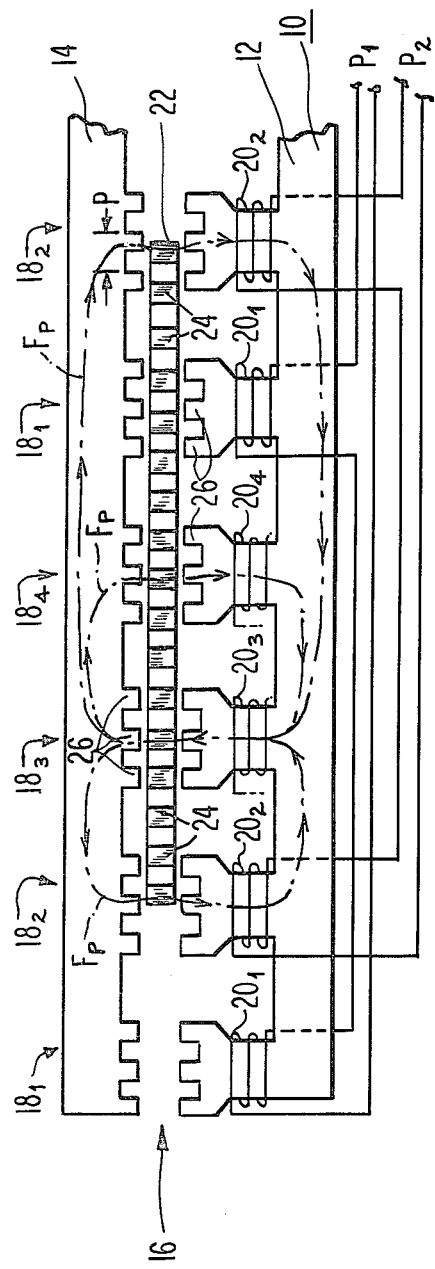
Fig. 3
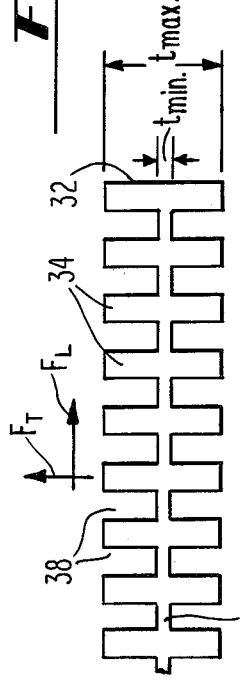
Fig. 4
Fig. 5
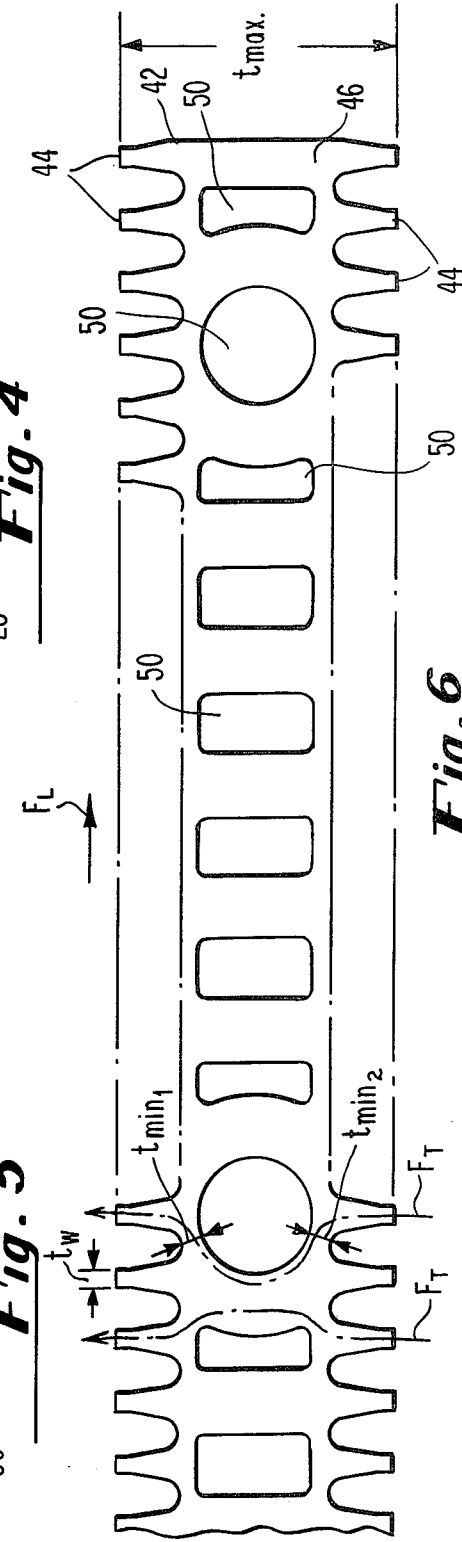
Fig. 6

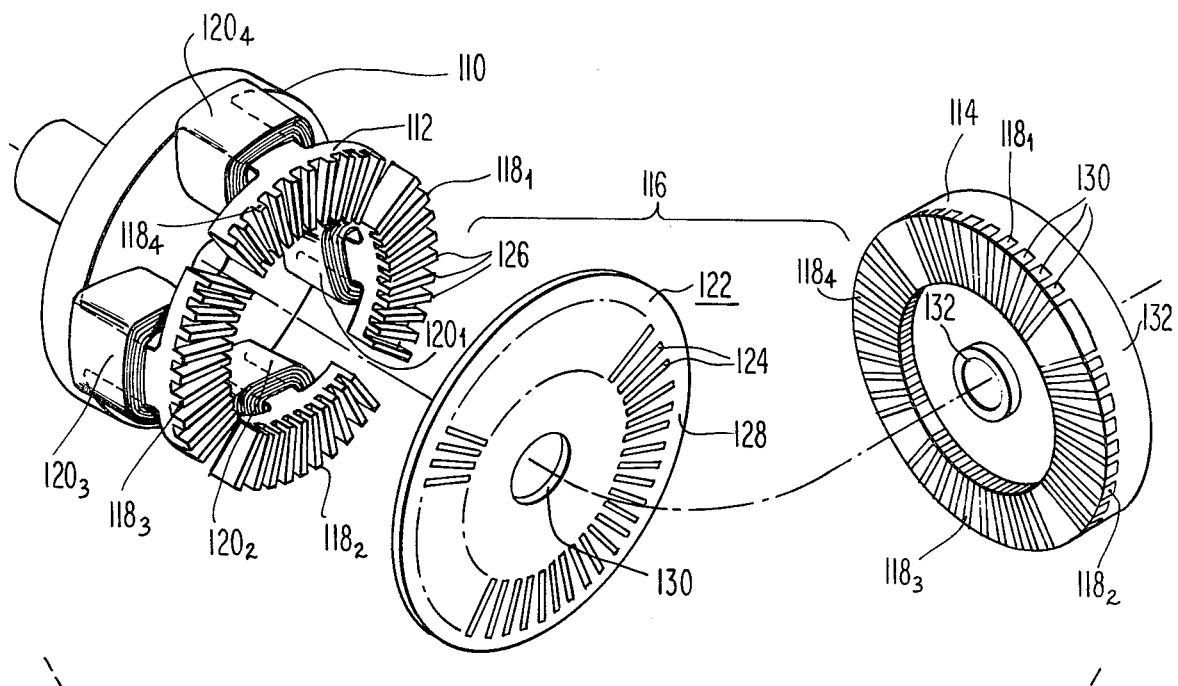
Fig. 7
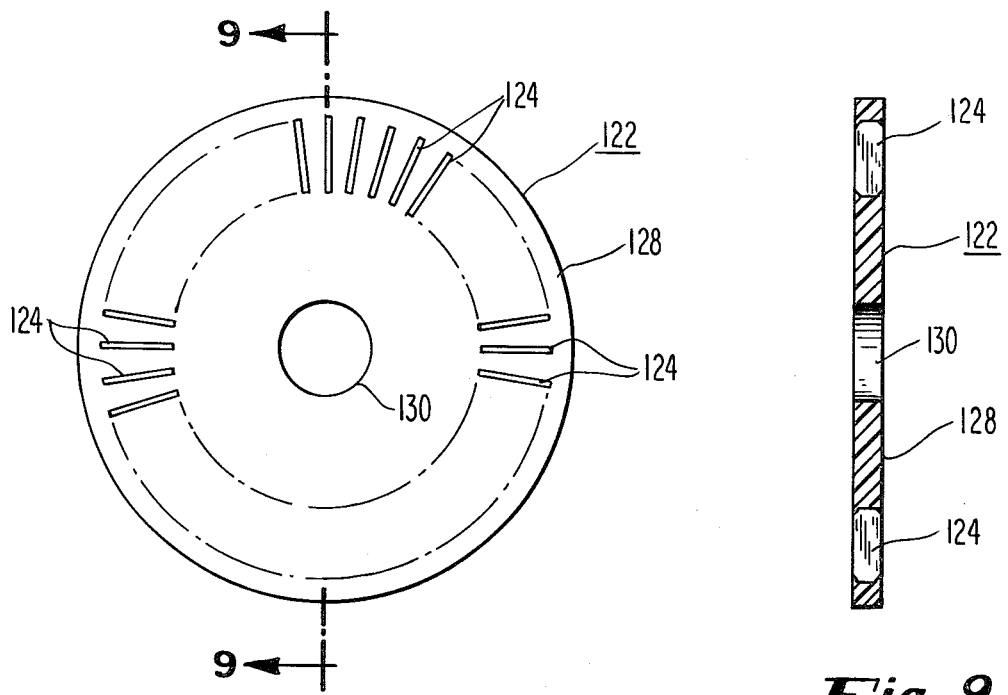
Fig. 8
Fig. 9

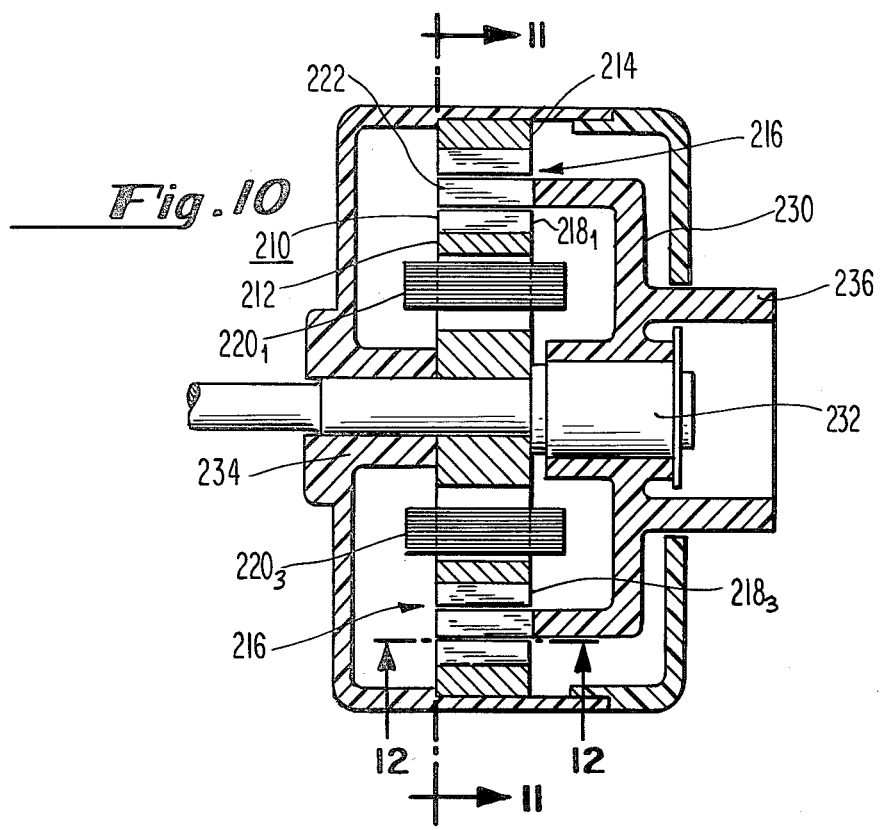
Fig. 10
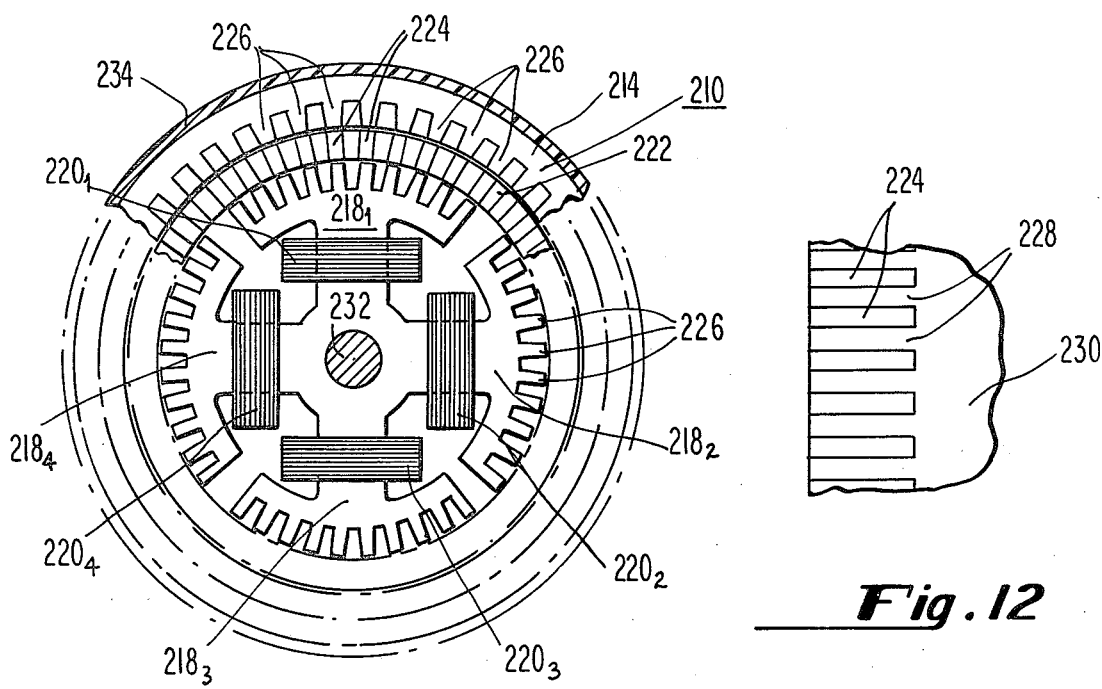
Fig. 11
Fig. 12

HIGH PERFORMANCE STEPPER MOTOR

BACKGROUND OF THE INVENTION

This invention relates to high performance stepper motors of the linear or rotary type which may be used in various applications including the electronic typewriter.

Variable reluctance stepper motors have been conveniently used as incremental motion transducers. However, for applications requiring a high force-to-mass ratio, such stepper motors have not, in some instances, been used because the force developed per unit of moving mass is not as high as for certain DC motors including both commutator type rotary DC motors and voice-coil linear DC motors.

Fredrickson U.S. Pat. No. 3,292,065 discloses a variable reluctance stepper motor of the linear type. In the embodiment of Fredrickson which achieves the highest force-to-mass ratio, the stator means is excited at the various pole positions on both sides of the longitudinally extended stator-to-stator air gap, i.e., double-sided excitation. However, the force-to-mass ratio of Fredrickson suffers for two reasons. First, the Fredrickson structure permits flux leakage longitudinally through the slider. In this connection, it will be noted that the nonmagnetic discontinuities between the teeth of the slider are relatively shallow, i.e., these discontinuities do not extend perpendicular or transverse to the direction of movement of the slider a distance substantially greater than the space between the teeth. Moreover, there are no additional discontinuities of nonmagnetic material in the slider. Accordingly, a rather unlimited longitudinal flux path through the magnetic material of the slider may be established for flux leakage which reduces the force-to-mass ratio for the slider of the motor. Second, the slider of Fredrickson extends outwardly beyond the ends of the stator so that a substantial portion of the slider is not generating force to drive the slider. Moreover, the slider portion extending beyond the air gap creates end effects which are detrimental to the drive. It will also be noted that the highest force-to-mass ratio embodiments disclosed in the Fredrickson patent require stator means with winding or excitation means on both sides of the longitudinally extending air gap which receives the slider.

Chai U.S. Pat. No. 3,867,676 also discloses a variable reluctance stepper motor of the linear type with double-sided excitation. Chai demonstrates no apparent concern for longitudinal flux leakage or its adverse effects on force-to-mass ratio. Significantly, the minimum thickness of the Chai slider which provides a longitudinal flux leakage path is always substantial relative to the maximum thickness at the extremities of the teeth, e.g., the minimum thickness is at least 25% of the maximum thickness. There is no discussion of an effort to minimize longitudinal flux leakage nor is there any suggestion in the specification that such longitudinal flux leakage has been minimized. In FIG. 9 where Chai achieves the minimum longitudinal flux leakage since the thickness of the slider is substantially less than the maximum thickness, the force-to-mass ratio is particularly small. This small force-to-mass ratio is the result of a single tooth per stator pole and a slider which always includes a substantial portion which extends beyond the stator structure and thereby produces no force.

Similarly, Schreiber et al. U.S. Pat. No. 3,162,796 also discloses a variable reluctance stepper motor of the linear type but demonstrates no interest in achieving a high force-to-mass ratio. In all of the Schreiber et al embodiments, there is a single tooth per stator pole and the slider extends beyond the stator structure so as to produce a small force-to-mass ratio. In almost all of the Schreiber et al embodiments, there is no stator structure on the interior of the cylindrical slider, and the minimum thickness of the slider is almost as great as the maximum thickness so as to permit return of the flux longitudinally through the slider which necessarily reduces the force-to-mass ratio. The embodiment of FIGS. 14 and 15 does disclose the use of interior stator structure which permits a "reduction in weight" of the slider although there is no suggestion that the force-to-mass ratio is increased and the shape of the teeth which preclude any effective generation of force by the exterior stator structure in FIG. 14 and the interior stator structure in FIG. 14 suggest a low force-to-mass ratio. In connection with FIG. 15, there is the suggestion that the portion of the slider between the teeth may even comprise a non-magnetizable material. However, there is no suggestion that the non-magnetizable material is chosen for purposes of limiting longitudinal flux leakage and the suggestion that the material be "austenitic boron steel" precludes a further reduction in weight.

An article entitled *Characteristics of a Synchronous Inductor Motor*, Snowdon and Madsen, Trans, AIEE (Applications in Industry) vol. 8, pp. 1–5, March 1962, discloses a stepper motor having a rotor which is confined to the air gap of the stator. However, the force-to-mass ratio is relatively small since the rotor acts as a longitudinal flux return path to a single-sided stator. In order to provide this longitudinal flux return path, the minimum thickness of the rotor between the teeth of the rotor is substantial relative to the maximum thickness of the rotor at the teeth. An article entitled *A Self-Oscillating Induction Motor for Shuttle Propulsion*, Laithwaite and Lawrenson, Proc. IEE, vol 104, part A, No. 14, April 1957, suggests that the rotor of Snowdon and Madsen might be unwound. However, the resulting slider would still have to provide a longitudinal flux return path for a single-sided slider. Therefore, even if the slider were shortened as disclosed in an article entitled Linear Induction Motors, Laithwaite, IEE, paper No. 2433 u, Dec. 1957, the slider would still have a relatively low force-to-mass ratio and while this force-to-mass ratio might be increased by utilizing the double sided stator disclosed in *Linear Induction Motors*, the configuration of the slider with its longitudinal flux leakage still severely limits the force-to-mass ratio.

SUMMARY OF THE INVENTION

It is an object of this invention to provide a stepper motor with a high force-to-mass ratio.

It is a further object of this invention to provide a stepper motor having geometric advantages in combination with a high force-to mass ratio.

It is also an object of this invention to provide a stepper motor at a relatively low cost while still preserving the high force-to-mass ratio.

In accordance with these and other objects of the invention, a high performance linear stepper motor comprises stator means including a plurality of pole positions with each of the pole positions including a plurality of magnetic stator elements on opposite sides of a stator-to-stator air gap with nonmagnetic material located in the spaces between the extremities of the magnetic stator elements on opposite sides of the air gap. Winding means are associated with the magnetic stator elements at the various pole positions on only one side of the air gap and are adapted to be excited so as to generate flux paths transverse to the air gap.

Passive motive means are located in the air gap. The passive motive means comprises a plurality of passive magnetic motive elements separated by nonmagnetic material. The motive elements have extremities juxtaposed to the extremities of the activating elements so as to close the transverse flux paths through the motive elements. In accordance with this invention, the motive means and the motive elements are always confined to the air gap with magnetic force acting on both sides of the air gap, and the motive means further comprises nonmagnetic discontinuities including nonmagnetic material so as to eliminate any substantial longitudinal flux leakage.

In further accordance with this invention, the activating means comprises discontinuities in the magnetic material including nonmagnetic material between the extremities of the passive elements so as to reduce the flux leakage path in the direction of movement of the passive means to less than 25% of the flux through the transverse flux paths. In a particularly preferred embodiment of the invention, discontinuities in the magnetic material decrease the flux leakage to less than 10% of the flux through the transverse flux paths. At the same time, the discontinuities comprising nonmagnetic material reduce the mass of the motive means so as to maximize the force-to-mass ratio of the motive means. In preferred embodiments of the invention, the longitudinal flux leakage of the motive means is minimized and the force-to-mass ratio is maximized by providing discontinuities which limit the minimum thickness of the motive means to less than 25% of the maximum thickness at the extremities of the motive elements and preferably less than 15%.

The discontinuities in the motive means may be formed by providing the motive means with a plurality of teeth on opposite sides thereof so as to form elements juxtaposed to the stator elements. Holes may be provided in the motive means to achieve additional discontinuities. In the alternative, the motive means may comprise discrete elements separated by discrete elements of nonmagnetic material therebetween.

In accordance with another important aspect of the invention, the motive means may be in the form of a slider as in the case of a linear motor or a rotor in the case of a rotary motor. Where the motive means comprises a slider, the slider is short relative to the length of the stator.

In accordance with the invention, the winding means associated with the activating means is limited to a single side of the air gap. This single-sided energization may be embodied in linear stepper motors as well as rotary stepper motors giving important geometric advantages, i.e., elimination of the windings on one side of the air gap affords greater freedom in mounting the motors and attaching loads to the motive means. When single-sided energization is employed, it is particularly important to achieve low longitudinal flux leakage through the motive means so as to maximize the force-to-mass ratio. It is also important to minimize longitudinal flux leakage so as to assure that the forces on the motive means at each side of the air gap are substantially equal or balanced.

BRIEF DESCRIPTION OF THE DRAWINGS

FIG. 1 is an elevational view of a linear stepper motor embodying the invention;

FIG. 2 is an enlarged, partially schematic view of a slider in the air gap of the stepper motor shown in FIG. 1 at one pole position;

FIG. 3 is a partial, slightly enlarged elevational view of a linear stepper motor embodying the invention;

FIG. 4 is an enlarged view of the slider in the linear motor of FIG. 3;

FIG. 5 is an elevational view of an alternative slider incorporating the principles of this invention;

FIG. 6 is an elevational view of another slider incorporating the principles of this invention;

FIG. 7 is an exploded view of an axial air gap rotary motor incorporating the principles of this invention;

FIG. 8 is a plan view of the rotor in FIG. 7;

FIG. 9 is a sectional view taken through line 9—9 of FIG. 8;

FIG. 10 is a sectional view along the axis of a radial air gap rotary motor incorporating the principles of this invention;

FIG. 11 is a sectional view of the motor of FIG. 10 taken along line 11—11 of FIG. 10; and FIG. 12 is a partial view of the rotor cup of the motor of FIG. 10 taken at line 12—12 of FIG. 10.

DETAILED DESCRIPTION OF PREFERRED EMBODIMENTS

Referring now to FIG. 1, a variable reluctance linear stepper motor is disclosed comprising a stator 10. The stator 10 comprises an active portion 12 and an inactive portion 14 which form stator-to-stator air gap 16 between a plurality of pole positions $18_1$, $18_2$, $18_3$, and $18_4$. Energization means in the form of windings $20_1$, $20_2$, $20_3$, and $20_4$ are provided at each of the pole positions $18_1$–$18_4$ on the active portion 12 of the stator 10. By utilizing single-sided excitation, the structure on one side of the air gap may be substantially eliminated so as to provide substantial geometric advantages, manufacturing economies, and weight reduction. However, it becomes particularly important to limit longitudinal flux leakage through the slider 22 to achieve a maximum, balanced force on the passive motive means.

The passive motive means in the form of a slider 22 is located in the air gap 16 for linear movement past the various pole positions $18_{1-4}$. As best shown in FIG. 2, the slider 22 comprises a plurality of passive magnetic motive elements or teeth 24 which extend longitudinally through the air gap 16 and along the slider 22. The teeth 24 cooperate with stator elements or teeth 26 of the stator 10 on both sides of the air gap 16 at each of the pole positions $18_{1-4}$ so as to close transverse magnetic flux paths across the gap 16.

In accordance with this invention as shown in FIG. 2, the slider 22 comprises substantial nonmagnetic discontinuities in the form of nonmagnetic material 28 between the teeth 24 which substantially eliminates any longitudinal flux leakage through the slider 22 while at the same time reducing the weight of the slider thereby maximizing the force-to-mass ratio of the motor. In further accordance with this invention as shown in FIG. 1, the slider 22 is short relative to the overall length of the air gap 16 so as to assure that the slider 22 and all of the teeth 24 are always confined to the air gap 16 so as to further maximize the force and eliminate any end effects on the slider 22. This assures that force is generated with respect to substantially all of the slider teeth 24. In FIG. 2, the slider 22 is schematically shown as comprising nothing more than moving teeth 24 separated by nonmagnetic material 28 comprising air gaps extending completely across the slider 22. In actuality, the teeth must be structurally interconnected although the weight of the interconnecting structure is preferably minimized so as to achieve a high force-to-mass ratio. Reference will now be made to FIGS. 3 and 4 where the slider 22 is shown as comprising discrete and solid nonmagnetic inserts and the windings $20_1$, $20_2$, $20_3$, and $20_4$ are shown in more detail.

As shown in FIG. 3, each of the two windings $20_1$ are connected in series as are each of the two windings $20_2$. A multiphased drive or source is connected to the windings $20_1$ and $20_2$ such that one phase $P_1$ is connected to the windings $20_1$ and another phase $P_2$ is connected to the windings $20_2$. Similarly, other drive phases are connected to partially shown windings $20_3$ and $20_4$ such that the windings $20_{1-4}$ are sequentially excited so as to sequentially energize the pole positions $18_{1-4}$.

As shown in FIG. 3, the teeth 24 at the pole position $18_3$ are precisely juxtaposed to the teeth 26 at that same pole position while the teeth 24 at the remaining pole positions are staggered with respect to the teeth 26. This is a result of simultaneous energization of the windings $20_2$, $20_3$, and $20_4$ during one of eight phases or steps of excitation. The flux paths $F_p$ extending longitudinally through the stator 10 and transversely across the slider 22 are shown in FIG. 1 for simultaneous energization of the windings $20_2$, $20_3$ and $20_4$. During the next or second phase of excitation, the windings $20_3$ and $20_4$ are energized so as to move the slider 22 a distance equal to $\frac{1}{8}$th of the pitch p of the teeth 26. In the next phase of excitation, the windings $20_3$, $20_4$ and $20_1$ are simultaneously energized so as to produce another step movement representing $\frac{1}{8}$th of the pitch p of the teeth 26 with precise alignment between the teeth 24 and the teeth 26 at the poled position $18_4$. This incremental movement of the slider 22 continues in accordance with principles well known in the art. In the alternative, four phases of excitation may be utilized so as to achieve a stepped distance of $\frac{1}{4}$th the pitch p between the leading edges or trailing edges of two adjacent teeth 26 with each of the four following winding excitations.

As stated previously, the longitudinal flux leakage through the slider 22, i.e., the longitudinal flux leakage in the direction of longitudinal motion through the air gap 16, is minimized so as to achieve a high force-to-mass ratio. This minimum longitudinal stator or flux leakage is achieved by providing magnetically distinct teeth 24 with substantial nonmagnetic material therebetween so as to substantially if not completely eliminate the longitudinal flux through the slider 22. In the other embodiments of the invention which will be described herein, the longitudinal flux is less than 25% of the transverse flux and preferably less than 10%. In the embodiment of FIGS. 1-4 the teeth 24 may be adhesively secured to the nonmagnetic material inserts 28. It has been found that the nonmagnetic material may comprise glass filled epoxy or ceramic and a particularly suitable adhesive is an epoxy resin. As shown in FIG. 2, transverse flux is depicted by an arrow $F_t$ and longitudinal flux is indicated by an arrow $F_L$. Since the longitudinal flux is substantially eliminated in this embodiment, the arrow $F_L$ has been shown in phantom. By eliminating the longitudinal flux leakage, all of the flux generated by the stator 10 produces useful force on the slider. Furthermore, the absence of longitudinal flux leakage means that the forces applied to the slider 22 at each side of the air gap are balanced so as to eliminate undesirable attractive forces between the slider 22 and one side of the stator 10.

In further accordance with the objective of achieving a high force-to-mass ratio for the slider 22 which is achieved by minimizing the weight of the material 28, each pole position $18_{1-4}$ comprises a plurality of teeth 26 so as to maximize the force generated at each pole position. Eight such teeth 26 have been shown although any number of teeth per pole may be used, but the teeth are preferably thin to maximize the force and minimize eddy currents. Of course, the number of teeth 24 in the slider 22 would be adjusted accordingly.

Reference will now be made to FIG. 5 wherein another slider 32 constructed in accordance with the principles of this invention is disclosed. As shown therein, teeth or actuated elements 34 extend outwardly from a central support section 36 which adds only slightly to the weight and creates only a very small path for undesirable longitudinal flux leakage. The nonmagnetic material between the teeth 34 which is formed by air spaces 38 extend perpendicular to the direction of longitudinal movement through the air gap 16 shown in FIG. 3 a distance substantially greater than the thickness of the support section 36, i.e., the minimum thickness of the slider.

In accordance with this invention, the teeth 34 of the slider 32 are of sufficient height such that the minimum thickness $t_{min}$ at the support section 36 is less than 25% of the maximum thickness $t_{max}$ and preferably less than 15%.

As indicated by the arrow $F_L$, there is some longitudinal flux through the support segment 36 of the passive slider shown in FIG. 5. However, the longitudinal flux $F_L$ is still less than 25% of the transverse flux $F_t$ and preferably less than 10%. As a result, a high force-to-mass ratio is achieved. It will of course be understood that the slider 32 is intended for use in the stator of FIGS. 1 and 3 and the slider is therefore short relative to the overall length of the stator 10 and the teeth 34 correspond in number and spacing to the teeth 24.

FIG. 6 discloses yet another passive slider 42 including a plurality of passive elements or teeth 44 located on opposite sides of a support segment 46 which is also adapted for use with the stator of FIGS. 1 and 3. In order to limit the longitudinal flux $F_L$ through the support segment 46 and maximize the transverse flux $F_t$, the support segment 46 includes a number of openings 50 of various sizes and configurations which diminish the longitudinal flux path and further serve to reduce the mass of the slider shown in FIG. 6. As a result, the force-to-mass ratio of the linear motor is greatly increased.

Although the slider of FIG. 6 differs somewhat in appearance from that of FIG. 5, it may also be used with the stator of FIG. 1 and the critical relationships discussed with respect to the slider of FIG. 3 are applicable. For example, the effective minimum thickness $t_{min\ 1} + t_{min\ 2}$ is still small relative to the maximum thickness $t_{max}$, i.e., less than 25% and preferably less than 15%.

In the embodiment of FIG. 6 as well as the embodiment of FIG. 3, the longitudinal flux leakage $F_L$ has been substantially reduced relative to the transverse flux $F_t$. More specifically, the longitudinal flux is less than 25% of the transverse flux and preferably less than 10%. In this embodiment, it will be understood that there is some longitudinal flux leakage around the openings 50 since the transverse flux path $F_T$ requires it. Accordingly, $t_{min\ 1}$ and $t_{min\ 2}$ must be sufficient to accomodate the transverse flux, and preferably $t_{min\ 1}$ and $t_{min\ 2}$ are greater than twice the tooth width $t_w$.

As utilized herein, the maximum thickness or maximum effective thickness means the thickness of the slider or the support segment generally transverse to the air gap 16. It will of course be understood that the sliders of FIGS. 1-6 do have thickness in a direction perpendicular to the direction of transverse and longitudinal flux, i.e., in a direction looking into the air gap 16 of FIGS. 1 and 3. In fact, this dimension which shall be referred to as the width may be substantially greater than the maximum thickness of the slider in a direction generally parallel to the transverse flux. Furthermore, it will be appreciated that the sliders 22, 32 and 42 as well as the stator 10 may comprise a plurality of laminations along the width of the slider so as to reduce eddy currents in accordance with the practice well known in the art.

Reference will now be made to FIGS. 7-9 wherein an axial air gap variable reluctance rotary stepper motor is disclosed which incorporates the principles of this invention. More particularly, the motor shown in FIG. 7 comprises a stator 110 including an active portion 112 and an inactive portion 114. In other words, the stator 110 is excited on only one side of an air gap 116 which is enlarged as a result of the exploded view of FIG. 5. The stator 110 forms a plurality of pole positions $118_1$, $118_2$, $118_3$, and $118_4$. Windings $120_1$, $120_2$, $120_3$, and $120_4$ are wrapped around axially extending portions of the pole structure at each of the pole positions $118_{1-4}$.

The excited or active portion 112 of the stator 110 comprises self-supporting magnetic material which forms a plurality of active elements or teeth 126 at each pole position which are juxtaposed across the air gap 116 to a plurality of stator teeth 130 which comprise slugs which are mounted in a support member 132 of the unexcited portion 114 of the stator 110. It will be understood that the teeth 130 of the various pole positions $118_{1-4}$ of the unexcited portion 114 are precisely aligned with the teeth 126 at the various pole positions $118_{1-4}$ on the excited portion 112.

In further accordance with the principles of this invention, passive motive means in the form of a rotor 122 comprises a nonmagnetic support structure 128 which supports and magnetically separates a plurality of discrete magnetic elements or slugs 124. As shown in FIG. 9, the slugs 124 extend completely through the nonmagnetic material 128 of the rotor 122. As shown in FIG. 8, the slugs 124 are evenly distributed on radial lines around the rotor 122. For simplicity, not all of the slugs 124 have been shown. It will however be understood that they are evenly distributed over 360°.

The windings $120_{1-4}$ are selectively energized in the same way as the windings $20_{1-4}$. More specifically, the windings may be energized as discussed in the foregoing. With such energization, the rotor 122 will advance ⅛th of the pitch between the teeth 126 so as to achieve precise alignment between the slugs 124 and the teeth 126 and 130 one of the pole positions $118_{1-4}$ every other phase of energization.

Although it has not been shown, it will be understood that a rotatable support member would extend through the opening 130 of the rotor 122 and into a bearing support opening 132 of the unexcited or inactive portion 114 and a similar support opening in the excited or active portion 112 of the stator 110.

In the embodiment of FIGS. 7-9, the longitudinal flux leakage in a direction parallel to or coincident with the rotational motion of the rotor 122, is eliminated. This is accomplished by eliminating any magnetic path between the slugs 124. It will be understood that various design features of the linear slider shown in FIGS. 5 and 6 might be incorporated in the rotor 122 while still achieving the all-important low longitudinal flux leakage so as to promote a high force-to-mass ratio for the rotor 122. For example, the rotor 122 which is analogous to the slider 22 may be formed in the manner of the slider shown in FIG. 5 where the teeth are contiguous with a magnetic support section and the overall thickness $t_{min}$ of that magnetic support section is sufficiently small relative to the overall or maximum thickness $t_{max}$ of the rotor so as to reduce the longitudinal flux leakage to less than 25% of the transverse flux through the air gap 116 and preferably less than 10%. Similarly, the design of the slider 42 shown in FIG. 6 might be incorporated in the rotor 122 so as to achieve reduced longitudinal flux leakage and a high force-to-mass ratio.

Reference will now be made to FIGS. 10-12 which disclose a radial air gap variable reluctance rotary stepper motor which also incorporates the principles of this invention. Once again, the stator 210 is excited on a single side. More particularly, the stator 210 comprises an active portion 212 which is wrapped with windings $220_{1-4}$ at the various pole positions $218_{1-4}$ and an inactive portion 214. A radial air gap 216 is formed between active elements or teeth 224 on opposite sides of the air gap 216.

As best shown in FIG. 11, the excited portion 212 of the stator 210 comprises a plurality of active elements or teeth 226 which are separated by nonmagnetic material in the form of air gaps at each of the pole positions $218_{1-4}$. In a similar way, the teeth 226 are formed in the unexcited or inactive portion 214 of the stator 210.

In accordance with this invention, a rotor 222 which extends into the axial air gap 216 comprises a plurality of discrete passive elements or slugs 224 which are carried by and separated from one another by nonmagnetic material 228 which forms a rotor cup 230. As shown in FIGS. 9 and 10, the slugs 224 extend through the rotor cup 230 so as to be in close proximity to the active elements or teeth 226 of the stator 210.

As shown in FIGS. 10 and 11, the rotor cup 230 is supported by a shaft 232 which extends through the excited portion 212 of the stator 210 and a housing 234. An annular portion 236 extends outwardly from the cup 230 and may be attached to a suitable load.

As in the previous embodiments, the radial air gap embodiment of FIGS. 10-12 may utilize a rotor analogous to the slider of FIGS. 5 and 6. More particularly, the rotor cup may be integrally formed from the magnetic rotor material with the support portion for the teeth of the rotor cup minimized in thickness so as to substantially reduce if not eliminate the longitudinal flux.

In the various embodiments described in the foregoing, the stator has been excited on only one side. With such single-sided excitation, it is particularly important to minimize longitudinal flux leakage through the slider or rotor and confine all longitudinal flux leakage to the stator. This assures the generation of the maximum force while enjoying substantial topological advantages, i.e., the windings need only be located on one side of the air gap. At the same time, manufacturing economies and motor weight reductions may be achieved. However, the principles of this invention are also applicable to a stepper motor where both sides of the stator are energized by windings.

Referring now to FIGS. 1 and 3, a multiphase drive associated with the windings $20_{1-4}$ has been described. Moreover, the multiphase drive has been described as providing the selective excitation of the windings in four different phases so as to permit the slider 22 to advance ¼th of the pitch of the teeth for each particular phase. As shown in FIGS. 1 and 3, the windings $20_1$ have been shown in series as have the windings $20_2$. This series configuration is preferred because this minimizes the AC component of flux that passes through a given pole when the slider is not in the vicinity of that pole. However, the windings $20_{1-4}$ need not be connected in series. It is also generally considered preferable to excite the pole so that adjacent poles have opposite polarization. In most cases where rapid motion is desired, the amount of flux passing through the poles will vary as exciting current varies but the polarity of the magnetization will not change. In some cases, it may even be desirable to provide some portion of the magnetization from a separate DC bias winding or from a permanent magnet. It will of course be appreciated that any intermediate step may be achieved by the proper choice of phase currents.

As shown in all embodiments of the invention, the motors have four phase windings. It is however possible to change the number of phases. For example, the number of phases may be reduced from four to three. Further, the number of teeth or active elements at each pole position may be varied, i.e., they may be increased from the eight shown in FIG. 1. Also, the number of pole positions may be varied.

In all of the embodiments of the invention, the spacing of the teeth or elements of the activating means or stator and the passive means or slider or rotor have been maintained as equal. This is not necessary. For example, every other tooth on the slider or rotor could be removed or the number of teeth per unit length could be slightly different for the stator and the slider or rotor. Also, the width of the teeth $t_w$ relative to the pitch p may be varied. For example, the teeth 24 and the nonmagnetic inserts 28 are shown as having equal width in FIGS. 3 and 4. It will be understood that this relationship may be varied and, in fact, it is preferred that the width of the teeth 24 be approximately 33% of the width of the inserts 28.

For various details of linear or rotary stepper motors which have not been set forth herein, reference is made to "Theory and Application of Step Motors," edited by Benjamin Kuo, West Publishing Co., 1974. This publication will, for example, describe in detail the structure and principles of stepper motors of the rotary and linear type.

As used herein the phrase stepper motor embraces variable reluctance motors which, because of their magnetic structure, are capable of operating in a mode which produces movement in discrete steps. However, the phrase is also intended to cover motors of this type which are operated in a mode producing continuous positioning.

It is also possible to achieve induction motor operation by suitably imbedding the teeth of the passive means in a conducting material. This could aid in starting or synchronizing or could provide the dominant force mechanism.

Although specific embodiments of the invention have been shown and described, it will be understood that other embodiments and modifications which will occur to those of ordinary skill in the art fall within the true spirit and scope of the invention as set forth in the appended claims.

What is claimed is:

1. A high performance linear stepper motor characterized by a high force-to-mass ratio comprising:
    stator means comprising a plurality of linearly arranged pole positions, each of said pole positions including a plurality of magnetic stator elements on opposite sides of a linear air gap with nonmagnetic material located in the spaces between the extremities of said magnetic stator elements on each of said opposite sides of said air gap;
    winding means associated with said stator means at said pole positions on only one side of said air gap for generating flux paths transverse to said air gap; and
    passive motive means comprising a slider located within said air gap comprising a plurality of passive magnetic motive elements and nonmagnetic discontinuities including nonmagnetic material separating said motive elements, said slider being short relative to the overall length of said air gap, said motive elements having extremities juxtaposed to the extremities of said stator elements so as to close said transverse flux paths through said motive elements, said motive means further comprising nonmagnetic discontinuities including said nonmagnetic material so as to eliminate any substantial longitudinal flux leakage.

2. The stepper motor of claim 1 wherein said discontinuities decrease said flux leakage to less than 25% of the flux through said flux paths.

3. The stepper motor of claim 2 wherein said discontinuities decrease said flux leakage to less than 10% of said flux through said flux paths.

4. The stepper motor of claim 1 wherein the minimum thickness of magnetic material in said motive means at said discontinuities is less than 25% of the maximum thickness of said motive means.

5. The stepper motor of claim 1 wherein said minimum thickness of magnetic material in said motive means at said discontinuities is less than 15% of the maximum thickness of said motive means.

6. The stepper motor of claim 1 wherein said slider includes a plurality of teeth on opposite sides thereof so as to form said motive elements juxtaposed to said stator elements.

7. The stepper motor of claim 6 wherein said discontinuities comprise a plurality of openings therein between said teeth on opposite sides thereof so as to minimize the longitudinal flux leakage.

8. The stepper motor of claim 1 wherein said motive elements are discrete and said discontinuities comprise a plurality of discrete nonmagnetic elements interposed between said motive elements so as to substantially eliminate the longitudinal flux leakage.

9. The stepper motor of claim 1 wherein said slider is less than one half as long as said air gap.

10. The stepper motor of claim 1 wherein said slider is less than one quarter as long as said air gap.

11. The stepper motor of claim 1 wherein said slider is sufficiently short relative to said air gap such that said slider may be removed from the air gap between each of said pole positions of said stator while still confining said motive elements of said slider to said air gap.

* * * * *